Patented July 22, 1952

2,604,458

UNITED STATES PATENT OFFICE 2,604,458

STABILIZING VINYLIDENE CHLORIDE-VINYL CHLORIDE COPOLYMERS

Carl B. Havens, Hope, Mich., assignor to The Dow Chemical Company, Midland, Mich., a corporation of Delaware No Drawing. Application June 2, 1950,
Serial No. 165,857

4 Claims. (Cl. 260—45.7)

This application is a continuation-in-part of copending application Serial No. 700,164 filed September 28, 1946 now abandoned, and relates to a composition of matter comprising a copolymer of from 85 to 95 per cent vinylidene chloride and complementarily from 15 to 5 per cent vinyl chloride, plasticized and stabilized with a particular group of modifiers to retain in the composition, after thermal fabrication operations, most of the desirable attributes of the copolymer.

The above-identified copolymers of vinylidene chloride and vinyl chloride find their major field of use in the manufacture of molded and extruded articles. Such manufacturing operations involve at least one step in which the copolymer is heated to a temperature at or near its fusion point. Prolonged heating in this range has been found to reduce the molecular weight of the copolymer, as evidenced by a reduction in its viscosity. Such changes in viscosity affect not only the conditions to be used in subsequent fabrication but also the properties of the fabricated copolymer.

Reference has been made to the viscosity of the copolymer. This value may be determined most conveniently using a standard solution of the copolymer in an organic solvent. Since the subject copolymer is only sparingly soluble, the solutions used are usually of from 1 to 2 per cent concentration, and the viscosity determinations are often made at elevated temperatures. The solvents which may be used include 1,4-dioxane, methyl isobutyl ketone, isophorone, cyclohexanone, orthodichlorobenzene, and the like. Each copolymer will exhibit a typical viscosity value when dissolved to a fixed concentration in one of these solvents at a given temperature. If the viscosity of a copolymer is determined in that manner before the polymer has been subjected to high temperatures in a fabrication operation, and another sample is dissolved and its viscosity measured after exposure to fusion temperatures, it is found that the heat-treated sample has a lower viscosity, as mentioned above. Samples taken from batches of the copolymer at intervals during a prolonged heating operation, when dissolved and tested, show progressively lower viscosity values.

There is evidence to indicate that a large part of the viscosity reduction occurring when these copolymers are heated is attributable in some way to the presence therein of 0.1 per cent or more of peroxide-containing materials which are generally the residues from the peroxide catalysts commonly used to induce polymerization of the original mixture of monomers to form the copolymer. Thus, it has been found that when the copolymer is treated in any of the known ways to remove peroxide residues, the so-treated material retains most of its original solution viscosity when subjected to heat treatment. Such peroxide extraction operations, however, add undesirably to the cost of producing the copolymer, and their use is to be avoided if possible.

While it has been found, as reported in the above-identified copending application, that the dihydric phenols pyrocatechol, resorcinol, hydroquinone and paratertiary butyl catechol may be added to the peroxide-containing copolymer and, in certain ratios relative to the peroxide present, will prevent any serious viscosity reduction of the copolymer due to the heat encountered in molding or extrusion operations, such phenolic bodies do not prevent the chemical decomposition of the copolymer. Hence, when such compositions are heated, they retain their viscosity, an indication that chain length of the copolymer is unaffected, but they liberate hydrogen chloride and turn brown or black, indicating the occurrence of chemical decomposition.

The overall problem of providing the vinylidene chloride-vinyl chloride copolymer compositions in a form useful for making shaped articles of high impact strength (values over 3.0) at low temperatures (about —18° C.) is complicated by the fact that such properties are not attainable even in products made from peroxide-free copolymers, unless the copolymer has a viscosity rating (2 per cent solution in orthodichlorobenzene at 120° C.) of at least 1.0 centipoise. Hence, for special purpose compositions to meet this test, a high viscosity copolymer must be used, and it must be modified with agents which not only repress the viscosity lowering effects of the peroxide but also prevent thermally induced chemical decomposition.

It is, accordingly, an object of the present invention to provide a composition of matter comprising a copolymer of from 85 to 95 per cent vinylidene chloride and complementarily from 15 to 5 per cent vinyl chloride, which composition contains at least 0.1 per cent of a peroxide, calculated as though it were benzoyl peroxide, and which is as resistant to thermally induced viscosity reduction as is the same copolymer when it is entirely free from peroxide. A related object is to provide such a composition which is not only resistant to reduction in viscosity upon heating, but is resistant, as well, to thermally induced chemical decomposition and discoloration. A further object is to provide such a composition which, after thermal fabrication into shaped articles, exhibits all of the aforesaid properties and, in addition, has high impact strength at low temperatures. Other and related objects may appear hereinafter.

It has been found that the first requirement of such a composition can be met by incorporating in the specified type of vinylidene chloride-vinyl chloride copolymer containing 0.1 per cent or more of benzoyl peroxide, or similar peroxidic catalyst residue, an amount of pyrocatechol, resorcinol, hydroquinone or para-tertiary butyl catechol so as to provide at least 0.15 part by weight of the dihydric phenol for each part of the peroxide (calculated as benzoyl peroxide), but not over 3 parts of the dihydric phenol per part of peroxide. The dihydric phenol protects the copolymer against thermally induced viscosity reduction, but does not prevent chemical decomposition. For convenience, the dihydric phenols enumerated above may sometimes be referred to hereinafter as "viscosity stabilizers."

It is known that the copolymer here concerned must be compounded with a small but significant amount of a plasticizer if it is to be extruded or molded satisfactorily. The plasticizer, seldom present in amounts over 15 per cent of the weight of the copolymer, and often used in amounts of 3 to 10 per cent, serves primarily as an aid to high temperature flow of the copolymer. While the presence of a plasticizer lowers the softening point of the composition, it does not prevent thermal decomposition and liberation of hydrogen chloride from the copolymer at temperatures at which the latter is molten. Especially useful plasticizers for fabrication of the herein-disclosed compositions are the alkyl, the mono-alkyl mono-benzyl, and the mono-alkyl mono-cyclohexyl diesters of adipic, azelaic and sebacic acids, wherein the alkyl groups have from 4 to 8 carbon atoms, and the diesters of diethylene glycol, dipropylene glycol or triethylene glycol with saturated aliphatic mono-carboxylic acids having from 3 to 8 carbon atoms. Other plasticizers, such as dibutyl phthalate, ethyl phthalyl, ethyl glycolate, and the like may be used, but with less advantage.

In order to provide compositions which are resistant to thermally induced chemical decomposition, it is necessary to incorporate in the composition yet another constituent. For this purpose, it has been found that small amounts (0.5 to 3 per cent) of disodium orthophosphate or of tetrasodium pyrophosphate are particularly effective.

The new and useful compositions, then, consist essentially of the identified vinylidene chloride- vinyl chloride copolymer containing at least 0.1 per cent of an organic peroxide (calculated as though it were benzoyl peroxide), from 0.5 to 3 per cent of disodium orthophosphate or of tetrasodium pyrophosphate, from 3 to 15 per cent of a plasticizer for the copolymer, and from 0.15 to 3 parts by weight of pyrocatechol, recorcinol, hydroquinone or paratertiary butyl catechol for each part by weight of the peroxide present in the copolymer. Such compositions not only retain their intrinsic viscosity when heated to fabrication temperatures, but are resistant to decomposition and discoloration at such temperatures and produce shaped articles having at least as high impact strengths at low temperatures as are found in similarly produced articles made from peroxide-free copolymer.

A simple test has been adopted for determination of the polymer's resistance to thermally induced decomposition. The test consists in heating a standard weight of the composition at 180° C. in a test tube and noting the time, in minutes, which elapses before a rapid evolution of hydrogen chloride occurs. For convenience, this elapsed time is designated the "T-value" of the composition. A high T-value indicates a thermally stable composition, and a low T-value denotes an unstable composition. Experience has shown that a T-value of at least 12 is required for satisfactory extrusion or molding of the copolymer here concerned. Compositions of this copolymer with T-values lower than 12 give trouble due to foaming or gas liberation during heat fabrication operations.

The following example illustrates the effect of pyrocatechol as a viscosity stabilizer in a copolymer made from 85 per cent vinylidene chloride monomer and 15 per cent vinyl chloride monomer, and containing the indicated amounts of benzoyl peroxide. The analysis of the copolymer product was about 91 per cent vinylidene chloride and 9 per cent vinyl chloride:

EXAMPLE 1

A series of copolymers was prepared by polymerizing mixtures of 85 per cent of monomeric vinylidene chloride and 15 per cent of monomeric vinyl chloride, in agitated aqueous suspension, in the presence of various amounts of benzoyl peroxide, ranging upward from 0.1 per cent of the weight of monomers. Portions of the resulting copolymers were subjected to an extraction operation until these samples were free from peroxide. Additional peroxide was mixed with other samples, to give compositions containing as much as 10 per cent benzoyl peroxide. The peroxide-free material, and all of the other samples were compounded with 15 per cent of their weight of dibutyl phthalate (plasticizer). Various measured amounts of pyrocatechol were added to and mixed with the several compositions, as shown in the following table. Portions of each composition were tested to determine their viscosity in standard 2 per cent solution in ortho-dichlorobenzene at 120° C. Other portions of the same compositions were heated for 10 minutes at 179° C., after which they were cooled, dissolved to form a standard solution, and their viscosity was measured again. The results appear in the table, wherein "catechol" is used to mean pyrocatechol, or ortho-dihydroxybenzene. For convenience in analyzing the tabulated results, viscosity values lower than that for the peroxide-free material are indicated by a minus (—) sign.

Table 1

| Per Cent Benzoyl Peroxide | Per Cent Catechol | Solution Viscosity After 10 Min. at 179° C. |
|---|---|---|
| 0 | 0 | [1] 0.992 |
| 0 | 0 | [2] 0.935 |
| 0.1 | 0 | 0.866— |
| 0.5 | 0 | 0.833— |
| 1.0 | 0 | 0.763— |
| 2.0 | 0 | 0.718— |
| 3.0 | 0 | 0.688— |
| 5.0 | 0 | 0.642— |
| 10.0 | 0 | 0.639— |
| 0 | 0.1 | 0.965 |
| 0.1 | 0.1 | 0.976 |
| 0.5 | 0.1 | 0.979 |
| 1.0 | 0.1 | 0.829— |
| 2.0 | 0.1 | 0.749— |
| 3.0 | 0.1 | 0.724— |
| 5.0 | 0.1 | 0.686— |
| 0 | 0.25 | 0.974 |
| 0.1 | 0.25 | 0.983 |
| 1.0 | 0.25 | 1.008 |
| 2.0 | 0.25 | 0.890— |
| 3.0 | 0.25 | 0.778— |
| 5.0 | 0.25 | 0.712— |
| 10.0 | 0.25 | 0.680— |
| 0 | 0.50 | 0.978 |
| 0.1 | 0.50 | 0.982 |
| 1.0 | 0.50 | 1.045 |
| 2.0 | 0.50 | 1.017 |
| 3.0 | 0.50 | 1.003 |
| 5.0 | 0.50 | 0.814— |
| 10.0 | 0.50 | 0.730— |
| 0 | 1.0 | 0.980 |
| 0.1 | 1.0 | 0.985 |
| 0.5 | 1.0 | 1.020 |
| 1.0 | 1.0 | 1.164 |
| 2.0 | 1.0 | Insoluble |
| 3.0 | 1.0 | Insoluble |
| 5.0 | 1.0 | 1.068 |
| 10.0 | 1.0 | 0.804— |

[1] Unheated sample.
[2] Reference sample.

The peroxide-free samples, while showing slightly higher viscosity values when treated with catechol, did not need the treatment in order to retain a satisfactory proportion of their viscosity when heated to the fusion point. A peroxide-free sample containing no catechol was used to obtain the reference value for comparison with other samples. All samples containing 0.1 per cent or more of peroxide, but without catechol, were inferior to the control in their viscosity retention. An amount of catechol equal to 0.2–1.0 times the weight of peroxide was found to afford adequate protection at 0.1 per cent catechol concentration, but ratios below these values, i. e. with more than 0.5 per cent peroxide and only 0.1 per cent catechol, were unsatisfactory. Similarly, at 0.25 per cent catechol concentrations, protection was afforded to samples containing up to 1.0 per cent peroxide, but not to those containing 2 per cent or more of the peroxide, and it is seen that a ratio of 0.125 part of catechol per part of peroxide is not effective. When the per cent of catechol is increased to 0.50, protection is afforded to samples containing up to 3.0 per cent peroxide, and a ratio of 0.167 is found to be effective while one of 0.10 is not. In the series containing 1.0 per cent catechol, protection is afforded to all samples tested through 5 per cent peroxide, but not to the 10 per cent peroxide sample. Two of these samples had such a high viscosity they could not be dissolved in the solvent employed in these tests. A plot of these data shows an effective range of from 0.15 to 1.0 part of catechol per part by weight of benzoyl peroxide.

To show the general equivalence of the four previously named dihydric phenols as viscosity stabilizers, the following additional examples are given:

EXAMPLE 2

A plasticized copolymer of about 90 per cent vinylidene chloride and about 10 per cent vinyl chloride, containing 0.5 per cent of peroxide (calculated as benzoyl peroxide) had a viscosity (2 per cent in ortho-dichloro-benzene at 120° C.) of 1.131 before being heated, and of 1.013 after being heated 5 minutes in an open test tube at 180° C. Various amounts of the dihydric phenols were added to portions of the unheated copolymer product, and their viscosity retention values were determined. The results appear in Table 2.

Table 2

| Dihydric Phenol | Amount, Per Cent | Viscosity After 5 Minutes' Heating at 180° C. |
|---|---|---|
| None | 0 | 1.013 |
| Catechol | 5 | 1.148 |
| Do | 3 | 1.218 |
| Do | 2 | 1.221 |
| Do | 1 | 1.177 |
| Do | 0.5 | 1.168 |
| Do | 0.1 | 1.140 |
| Resorcinol | 1.0 | 1.259 |
| Do | 0.1 | 1.104 |
| Hydroquinone | 1.0 | 1.141 |
| Do | 0.1 | 1.120 |
| p-tertiary butyl catechol | 3.0 | 1.120 |
| Do | 1.0 | 1.136 |
| Do | 0.1 | 1.132 |

The four dihydric phenols are seen to be substantial equivalents, in a practical range of concentrations. It is observed that resorcinol is slightly less effective than the others, however, at the lower end of the effective concentrations range.

EXAMPLE 3

A molding powder, composed of a copolymer of about 85 per cent vinylidene chloride and 15 per cent vinyl chloride, containing about 0.75 per cent benzoyl peroxide, was plasticized with 15 per cent of its weight of dibutyl phthalate. Portions of this powder were mixed with 0.25 per cent, based on the weight of polymer, of a dihydric phenol, and, after samples had been taken for determination of the solution viscosity, the powders were heated to their fusion points and extruded over the course of a half hour, or more, to form a plastic pipe. The pipe was cooled, broken, and pieces were taken for another determination of the solution viscosity. The small change in value between the powder stage and the heat fabricated stage is an index of the protection afforded by the dihydric phenols.

Table 3

| Phenol | Solution Viscosity | | Viscosity Loss |
|---|---|---|---|
| | Powder | Extrusion | |
| Hydroquinone | 1.239 | 1.192 | 0.047 |
| Catechol | 1.226 | 1.189 | 0.037 |
| Tertiary butyl catechol | 1.214 | 1.145 | 0.069 |
| Beta-naphthol (for comparison) | 1.237 | 1.006 | 0.231 |
| Blank | 1.214 | 0.780 | 0.434 |

The dihydric phenols tested are seen to be from 4 to 6 times as effective as beta-naphthol, which is sometimes used as a "stabilizer" for other types of materials, but which is not found satisfactory for the present purpose.

The efficacy of the designated dihydric phenols is preventing significant viscosity decrease in heated samples of a peroxide-containing batch of the copolymer has been demonstrated. It must not lead one to conclude, however, that the phenol-containing composition is resistant to thermally induced chemical decomposition. Thus, the copolymer here concerned, when plasticized with any of the usual plasticizers, has a T-value of from 4 to 6 minutes, when the copolymer contains about 0.1 to 0.2 per cent of peroxides. The addition of a dihydric phenol to the composition does not increase the T-value, and often has been found to decrease the T-value to from 2 to 4 minutes. When, however, the plasticized, peroxide-containing copolymer is mixed intimately with a small amount of tetrasodium pyrophosphate or of disodium orthophosphate, the T-value is increased materially, as may be seen from the following Table 4, wherein each sample reported was identical except for the amount of the phosphate employed.

*Table 4*

| Per Cent Added Heat Stabilizer | T-value, Tetrasodium pyrophosphate | T-value, Disodium orthophosphate |
|---|---|---|
| 0 | 5 | 5. |
| 0.5 | 10 | 10 |
| 1.0 | 16 | about 15. |
| 2 | 25 | |
| 3 | 32 | 32. |
| 4 | 38 | |
| 5 | 43 | about 40. |

The above-noted effect of the designated phosphates as heat stabilizers for the copolymer is not materially altered by changes in the particular plasticizer used in the composition, though minor variations in T-values may be attributed to the plasticizer. This may be seen from the data in Table 5. Each composition there reported was made using the same copolymer, and each one contained 5 per cent of tetrasodium pyrophosphate, based on the weight of the copolymer.

*Table 5*

| Variation in T-value with Plasticizers | | | |
|---|---|---|---|
| Per Cent Plasticizer | Tributyl Aconitate | Dibutyl Phthalate | Triphenyl Phosphate |
| 2 | 40 | 39 | 37 |
| 4 | 42 | 39 | 35 |
| 8 | 44 | 40 | 34 |
| 12 | 46.5 | 40 | 32 |
| 16 | 49.5 | 42 | 30 |

A further series of tests was made, using compositions which varied only in the particular plasticizer employed. Each composition consisted of the copolymer of about 90 per cent vinylidene chloride and 10 per cent vinyl chloride having over 0.1 per cent residual benzoyl peroxide and a like amount of pyrocatechol and 2 per cent of tetrasodium pyrophosphate and 15 per cent of the plasticizer. The T-values of representative ones of such compositions are given in Table 6.

*Table 6*

| Plasticizer | T-value |
|---|---|
| None | 23.5 |
| Tributyl tricarballylate | 30 |
| Tributyl aconitate | 32 |
| Dibutyl succinate | 30 |
| Diamyl maleate | 30 |
| Dibutyl adipate | 30 |
| Dibutyl azelate | 30 |
| Dibutyl sebacate | 31 |
| Dipropylene glycol dicaproate | 30 |

The compositions of the present invention have been found to be stable, both as to viscosity retention and resistance to chemical decomposition and discoloration upon heating. Where these results are the chief ones desired, the molecular weight (evidenced by solution viscosity) of the copolymer is of minor importance. When, however, it is necessary to obtain an extruded or molded product having high impact strengths, it is necessary to make the new compositions from the copolymer with high initial solution viscosity. Thus, impact strengths at $-18°$ C. over 3 inch pounds are only attainable from the copolymer when the latter has a viscosity rating over 1.0 centipoise, as measured on a 2 per cent solution in orthodichlorobenzene at $120°$ C. This is illustrated in the following Table 7. The compositions here reported differ only in the viscosity rating of the copolymer employed. Each composition contains 0.5 per cent each of benzoyl peroxide and pyrocatechol, 5 per cent tetrasodium pyrophosphate and 15 per cent dibutyl sebacate, while the copolymer had the analysis reported in the prior examples and tables.

*Table 7*

| Viscosity Rating of Copolymer | Impact strength, inch pounds | |
|---|---|---|
| | Unnotched, $-18°$ C. | Notched, $25°$ C. |
| 0.935 | 2.15 | 1.85 |
| 1.02 | 3.10 | 2.65 |
| 1.06 | 4.10 | 3.50 |
| 1.17 | >5 | >4.4 |

It has been found, as well, that the analysis of the copolymer is important if the desired results are to be obtained. This may be demonstrated by means of the data in the following Table 8. The variable in the compositions here reported is the amount of vinyl chloride in the monomer mixture from which the copolymers were made under otherwise identical conditions. Each copolymer was one whose solution viscosity was between 1.15 and 1.20 centipoises. Each composition contained the same kinds and amounts of peroxide, viscosity stabilizer, heat stabilizer, and plasticizer as were present in the compositions reported in the preceding table. The physical tests were made on molded samples, 0.1 inch thick.

*Table 8*

| Per Cent Vinyl Chloride in Monomer Charge | Impact Strength, inch pounds | | Tensile Strength, lbs./sq. in. |
|---|---|---|---|
| | Unnotched, $-18°$ C. | Notched, $25°$ C. | |
| 5 | 3.1 | 1.75 | 3,600 |
| 10 | 3.2 | 2.1 | 2,950 |
| 15 | 5.5 | 4.1 | 2,500 |

It becomes apparent that, in order to make fabricated articles having high impact strength at low temperatures and high tensile strength, it is necessary for the copolymer to be one whose vinyl chloride content is from 5 to 15 per cent, balance vinylidene chloride, as well as one whose viscosity, measured in a 2 per cent solution in orthodichlorobenzene at $120°$ C., is at least 1 centipoise, and preferably 1.1 centipoises or higher. Owing to the generally unreliable nature of chemical analyses of vinylidene chloride-vinyl chloride copolymer systems, it is generally preferred to identify such copolymers by reference to the monomer mixture from which they have been produced.

I claim:

1. A composition of matter comprising a copolymer of from 95 to 85 per cent vinylidene chloride, balance vinyl chloride, containing at least 0.1 per cent by weight of an organic peroxide catalyst residue, calculated as benzoyl peroxide, from 0.15 to 3 parts by weight, for each part of peroxide, of a dihydric phenol selected from the group consisting of pyrocatechol, resorcinol, hydroquinone and para-tertiary butyl catechol; from 0.5 to 3 per cent, based on the weight of copolymer, of a material selected from the group consisting of tetrasodium pyrophosphate and disodium orthophosphate, and from 3 to 15 per cent of a plasticizer for the copolymer.

2. The composition claimed in claim 1, wherein the dihydric phenol is pyrocatechol.

3. The composition claimed in claim 1, wherein the inorganic heat stabilizer is tetrasodium pyrophosphate.

4. The composition claimed in claim 1, wherein the copolymer employed has a viscosity rating of at least 1 centipoise, measured at 120° C. on a 2 per cent solution of the copolymer in orthodichlorobenzene.

CARL B. HAVENS.

REFERENCES CITED

The following references are of record in the file of this patent:

UNITED STATES PATENTS

| Number | Name | Date |
|---|---|---|
| 2,235,796 | Britton et al. | Mar. 18, 1941 |
| 2,277,504 | Wiley | Mar. 24, 1942 |
| 2,304,466 | Matheson et al. | Dec. 8, 1942 |
| 2,320,375 | Moulton | June 1, 1943 |
| 2,477,657 | Schaefer | Aug. 2, 1949 |